(12) United States Patent
Harigai

(10) Patent No.: US 8,437,541 B2
(45) Date of Patent: May 7, 2013

(54) COLOR CORRECTION COEFFICIENT GENERATING APPARATUS, COLOR CORRECTION COEFFICIENT GENERATION METHOD, AND COMPUTER READABLE MEDIUM STORING PROGRAM

(75) Inventor: Jungo Harigai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 86 days.

(21) Appl. No.: 13/028,605

(22) Filed: Feb. 16, 2011

(65) Prior Publication Data

US 2012/0045124 A1   Feb. 23, 2012

(30) Foreign Application Priority Data

Aug. 18, 2010   (JP) .................................. 2010-183099

(51) Int. Cl.
*G06K 9/00*   (2006.01)
(52) U.S. Cl.
USPC ......................................... 382/162; 382/167
(58) Field of Classification Search ........... 382/162–167
See application file for complete search history.

(56) References Cited

U.S. PATENT DOCUMENTS

| 6,100,999 | A * | 8/2000 | Ikegami | 358/1.9 |
| 8,260,045 | B2 * | 9/2012 | Harigai | 382/167 |
| 2009/0208101 | A1 | 8/2009 | Harigai | |

FOREIGN PATENT DOCUMENTS

JP   A-10-262157   9/1998

* cited by examiner

*Primary Examiner* — Alex Liew
(74) *Attorney, Agent, or Firm* — Oliff & Berridge, PLC

(57) ABSTRACT

A color correction coefficient generating apparatus includes a first color information obtaining unit that obtains pieces of color information to be corrected in a color space made up of plural color components including a specific color component, a second color information obtaining unit that obtains pieces of color information used for correction corresponding to the pieces of color information to be corrected in the color space, a weighting coefficient obtaining unit that obtains weighting coefficients corresponding to the pieces of color information to be corrected, on the basis of a position relationship between colors represented by the pieces of color information to be corrected and a specified color region and weights that are based on densities of the colors represented by the pieces of color information to be corrected, and a generating unit that generates color correction coefficients for correcting specific density values.

11 Claims, 16 Drawing Sheets

| COLOR VALUES TO BE CORRECTED | | | COLOR VALUES USED FOR CORRECTION | | | WEIGHTING COEFFICIENTS |
|---|---|---|---|---|---|---|
| C | M | Y | C' | M' | Y' | W |
| 0 | 0 | 0 | 0 | 0 | 0 | 1.00 |
| 0 | 0 | 1 | 0 | 0 | 2 | 1.00 |
| 0 | 0 | 2 | 0 | 0 | 3 | 1.00 |
| 0 | 0 | 3 | 0 | 0 | 4 | 1.00 |
| 0 | 0 | 5 | 0 | 0 | 6 | 0.80 |
| 0 | 0 | 7 | 0 | 0 | 9 | 0.50 |
| 0 | 0 | 10 | 0 | 0 | 12 | 0.43 |
| 0 | 0 | 20 | 0 | 0 | 25 | 0.43 |
| 0 | 0 | 30 | 0 | 0 | 35 | 0.43 |
| 0 | 0 | 40 | 0 | 0 | 46 | 0.43 |
| 0 | 0 | 50 | 0 | 0 | 55 | 0.43 |
| 0 | 0 | 60 | 0 | 0 | 66 | 0.43 |
| 0 | 0 | 70 | 0 | 0 | 74 | 0.43 |
| 0 | 0 | 80 | 0 | 0 | 84 | 0.50 |
| 0 | 0 | 90 | 0 | 0 | 92 | 0.80 |
| 0 | 0 | 100 | 0 | 0 | 100 | 1.00 |
| : | : | : | : | : | : | : |
| 1 | 1 | 1 | 1 | 1 | 2 | 0.00 |
| 2 | 2 | 2 | 2 | 2 | 3 | 0.00 |
| 3 | 3 | 3 | 3 | 3 | 4 | 0.00 |
| 5 | 5 | 5 | 4 | 4 | 5 | 0.20 |
| 7 | 7 | 7 | 6 | 6 | 7 | 0.50 |
| 10 | 10 | 10 | 12 | 11 | 13 | 0.90 |
| 20 | 20 | 20 | 23 | 22 | 22 | 1.00 |
| 30 | 30 | 30 | 31 | 33 | 31 | 1.00 |
| 40 | 40 | 40 | 39 | 42 | 44 | 1.00 |
| 50 | 50 | 50 | 53 | 51 | 50 | 1.00 |
| 60 | 60 | 60 | 61 | 63 | 59 | 1.00 |
| 70 | 70 | 70 | 69 | 72 | 71 | 0.90 |
| 80 | 80 | 80 | 81 | 82 | 83 | 0.50 |
| 90 | 90 | 90 | 90 | 92 | 91 | 0.20 |
| 100 | 100 | 100 | 100 | 99 | 98 | 0.00 |

FIG. 2

| COLOR VALUES TO BE CORRECTED | | | COLOR VALUES USED FOR CORRECTION | | |
|---|---|---|---|---|---|
| C | M | Y | C' | M' | Y' |
| 0 | 0 | 0 | 0 | 0 | 0 |
| 0 | 0 | 10 | 0 | 0 | 12 |
| 0 | 0 | 20 | 0 | 0 | 25 |
| 0 | 0 | 30 | 0 | 0 | 35 |
| : | : | : | : | : | : |
| 50 | 50 | 10 | 43 | 51 | 15 |
| 50 | 50 | 20 | 47 | 54 | 30 |
| 50 | 50 | 30 | 49 | 49 | 40 |
| : | : | : | : | : | : |
| 100 | 100 | 80 | 99 | 95 | 83 |
| 100 | 100 | 90 | 100 | 97 | 91 |
| 100 | 100 | 100 | 100 | 99 | 97 |

FIG. 3A

| TARGET COLOR RAW DATA | | | | | |
|---|---|---|---|---|---|
| C | M | Y | L* | a* | b* |
| 0 | 0 | 0 | L01 | a01 | b01 |
| 0 | 0 | 25 | L02 | a02 | b02 |
| 0 | 0 | 50 | L03 | a03 | b03 |
| 0 | 0 | 75 | L04 | a04 | b04 |
| 0 | 0 | 100 | L05 | a05 | b05 |
| 0 | 25 | 0 | L06 | a06 | b06 |
| 0 | 25 | 25 | L07 | a07 | b07 |
| ⋮ | ⋮ | ⋮ | ⋮ | ⋮ | ⋮ |

FIG. 3B

| DEVICE OUTPUT COLOR RAW DATA | | | | | |
|---|---|---|---|---|---|
| C | M | Y | L* | a* | b* |
| 0 | 0 | 0 | L11 | a11 | b11 |
| 0 | 0 | 25 | L12 | a12 | b12 |
| 0 | 0 | 50 | L13 | a13 | b13 |
| 0 | 0 | 75 | L14 | a14 | b14 |
| 0 | 0 | 100 | L15 | a15 | b15 |
| 0 | 25 | 0 | L16 | a16 | b16 |
| 0 | 25 | 25 | L17 | a17 | b17 |
| ⋮ | ⋮ | ⋮ | ⋮ | ⋮ | ⋮ |

SINGLE-COLOR-EMPHASIZED WEIGHTING
COEFFICIENT FUNCTION

SINGLE COLOR GRADATION WEIGHTING
COEFFICIENT FUNCTION

GRAY-EMPHASIZED WEIGHTING
COEFFICIENT FUNCTION

GRAY GRADATION WEIGHTING
COEFFICIENT FUNCTION

FIG. 12

| COLOR VALUES TO BE CORRECTED | | | COLOR VALUES USED FOR CORRECTION | | |
|---|---|---|---|---|---|
| C | M | Y | C' | M' | Y' |
| 0 | 0 | 0 | 0 | 0 | 0 |
| 0 | 0 | 1 | 0 | 0 | 2 |
| 0 | 0 | 2 | 0 | 0 | 3 |
| 0 | 0 | 3 | 0 | 0 | 4 |
| 0 | 0 | 5 | 0 | 0 | 6 |
| 0 | 0 | 7 | 0 | 0 | 9 |
| 0 | 0 | 10 | 0 | 0 | 12 |
| 0 | 0 | 20 | 0 | 0 | 25 |
| 0 | 0 | 30 | 0 | 0 | 35 |
| 0 | 0 | 40 | 0 | 0 | 46 |
| 0 | 0 | 50 | 0 | 0 | 55 |
| 0 | 0 | 60 | 0 | 0 | 66 |
| 0 | 0 | 70 | 0 | 0 | 74 |
| 0 | 0 | 80 | 0 | 0 | 84 |
| 0 | 0 | 90 | 0 | 0 | 92 |
| 0 | 0 | 100 | 0 | 0 | 100 |
| : | : | : | : | : | : |
| 1 | 1 | 1 | 1 | 1 | 2 |
| 2 | 2 | 2 | 2 | 2 | 3 |
| 3 | 3 | 3 | 3 | 3 | 4 |
| 5 | 5 | 5 | 4 | 4 | 5 |
| 7 | 7 | 7 | 6 | 6 | 7 |
| 10 | 10 | 10 | 12 | 11 | 13 |
| 20 | 20 | 20 | 23 | 22 | 22 |
| 30 | 30 | 30 | 31 | 33 | 31 |
| 40 | 40 | 40 | 39 | 42 | 44 |
| 50 | 50 | 50 | 53 | 51 | 50 |
| 60 | 60 | 60 | 61 | 63 | 59 |
| 70 | 70 | 70 | 69 | 72 | 71 |
| 80 | 80 | 80 | 81 | 82 | 83 |
| 90 | 90 | 90 | 90 | 92 | 91 |
| 100 | 100 | 100 | 100 | 99 | 98 |

FIG. 13

| COLOR VALUES TO BE CORRECTED | | | COLOR VALUES USED FOR CORRECTION | | | WEIGHTING COEFFICIENTS |
|---|---|---|---|---|---|---|
| C | M | Y | C' | M' | Y' | W |
| 0 | 0 | 0 | 0 | 0 | 0 | 1.00 |
| 0 | 0 | 1 | 0 | 0 | 2 | 1.00 |
| 0 | 0 | 2 | 0 | 0 | 3 | 1.00 |
| 0 | 0 | 3 | 0 | 0 | 4 | 1.00 |
| 0 | 0 | 5 | 0 | 0 | 6 | 0.80 |
| 0 | 0 | 7 | 0 | 0 | 9 | 0.50 |
| 0 | 0 | 10 | 0 | 0 | 12 | 0.43 |
| 0 | 0 | 20 | 0 | 0 | 25 | 0.43 |
| 0 | 0 | 30 | 0 | 0 | 35 | 0.43 |
| 0 | 0 | 40 | 0 | 0 | 46 | 0.43 |
| 0 | 0 | 50 | 0 | 0 | 55 | 0.43 |
| 0 | 0 | 60 | 0 | 0 | 66 | 0.43 |
| 0 | 0 | 70 | 0 | 0 | 74 | 0.43 |
| 0 | 0 | 80 | 0 | 0 | 84 | 0.50 |
| 0 | 0 | 90 | 0 | 0 | 92 | 0.80 |
| 0 | 0 | 100 | 0 | 0 | 100 | 1.00 |
| : | : | : | : | : | : | : |
| 1 | 1 | 1 | 1 | 1 | 2 | 0.00 |
| 2 | 2 | 2 | 2 | 2 | 3 | 0.00 |
| 3 | 3 | 3 | 3 | 3 | 4 | 0.00 |
| 5 | 5 | 5 | 4 | 4 | 5 | 0.20 |
| 7 | 7 | 7 | 6 | 6 | 7 | 0.50 |
| 10 | 10 | 10 | 12 | 11 | 13 | 0.90 |
| 20 | 20 | 20 | 23 | 22 | 22 | 1.00 |
| 30 | 30 | 30 | 31 | 33 | 31 | 1.00 |
| 40 | 40 | 40 | 39 | 42 | 44 | 1.00 |
| 50 | 50 | 50 | 53 | 51 | 50 | 1.00 |
| 60 | 60 | 60 | 61 | 63 | 59 | 1.00 |
| 70 | 70 | 70 | 69 | 72 | 71 | 0.90 |
| 80 | 80 | 80 | 81 | 82 | 83 | 0.50 |
| 90 | 90 | 90 | 90 | 92 | 91 | 0.20 |
| 100 | 100 | 100 | 100 | 99 | 98 | 0.00 |

FIG. 15

| COLOR VALUES TO BE CORRECTED | COLOR VALUES USED FOR CORRECTION | WEIGHTING COEFFICIENTS |
|---|---|---|
| Y | Y' | W |
| 0 | 0 | 1.00 |
| 1 | 2 | 1.00 |
| 2 | 3 | 1.00 |
| 3 | 4 | 1.00 |
| 5 | 6 | 0.80 |
| 7 | 9 | 0.50 |
| 10 | 12 | 0.43 |
| 20 | 25 | 0.43 |
| 30 | 35 | 0.43 |
| 40 | 46 | 0.43 |
| 50 | 55 | 0.43 |
| 60 | 66 | 0.43 |
| 70 | 74 | 0.43 |
| 80 | 84 | 0.50 |
| 90 | 92 | 0.80 |
| 100 | 100 | 1.00 |
| : | : | : |
| 1 | 2 | 0.00 |
| 2 | 3 | 0.00 |
| 3 | 4 | 0.00 |
| 5 | 5 | 0.20 |
| 7 | 7 | 0.50 |
| 10 | 13 | 0.90 |
| 20 | 22 | 1.00 |
| 30 | 31 | 1.00 |
| 40 | 44 | 1.00 |
| 50 | 50 | 1.00 |
| 60 | 59 | 1.00 |
| 70 | 71 | 0.90 |
| 80 | 83 | 0.50 |
| 90 | 91 | 0.20 |
| 100 | 98 | 0.00 |

COLOR CORRECTION COEFFICIENT GENERATING APPARATUS, COLOR CORRECTION COEFFICIENT GENERATION METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2010-183099 filed Aug. 18, 2010.

BACKGROUND

Technical Field

The present invention relates to a color correction coefficient generating apparatus, a color correction coefficient generation method, and a computer readable medium storing a program.

SUMMARY

According to an aspect of the invention, there is provided a color correction coefficient generating apparatus including: a first color information obtaining unit that obtains pieces of color information to be corrected in a color space made up of plural color components including a specific color component; a second color information obtaining unit that obtains pieces of color information used for correction corresponding to the pieces of color information to be corrected in the color space; a weighting coefficient obtaining unit that obtains weighting coefficients corresponding to the pieces of color information to be corrected, on the basis of a position relationship between colors represented by the pieces of color information to be corrected and a specified color region, and weights that are based on densities of the colors represented by the pieces of color information to be corrected; and a generating unit that generates color correction coefficients for correcting specific density values, by using density values of the specific color component of the plural pieces of color information used for correction corresponding to the plural pieces of color information to be corrected in which the specific color component has the specific density values, and the plural weighting coefficients corresponding to the plural pieces of color information to be corrected in which the specific color component has the specific density values.

BRIEF DESCRIPTION OF THE DRAWINGS

Exemplary embodiment(s) of the present invention will be described in detail based on the following figures, wherein:

FIG. 2 is a diagram illustrating an example of the correspondence between color values to be corrected and color values used for correction that are generated in the exemplary embodiment of the present invention;

FIGS. 3A and 3B are diagrams illustrating an example of target color raw data and device output color raw data used in the exemplary embodiment of the present invention;

FIG. 12 is a diagram illustrating an example of the correspondence between color values to be corrected and color values used for correction that are generated in the exemplary embodiment of the present invention;

FIG. 13 is a diagram illustrating a state where weighting coefficients are set to the correspondence between color values to be corrected and color values used for correction that are generated in the exemplary embodiment of the present invention;

FIG. 15 is a diagram illustrating an example of a one-dimensional LUT generated in the exemplary embodiment of the present invention.

DETAILED DESCRIPTION

Figure 1:
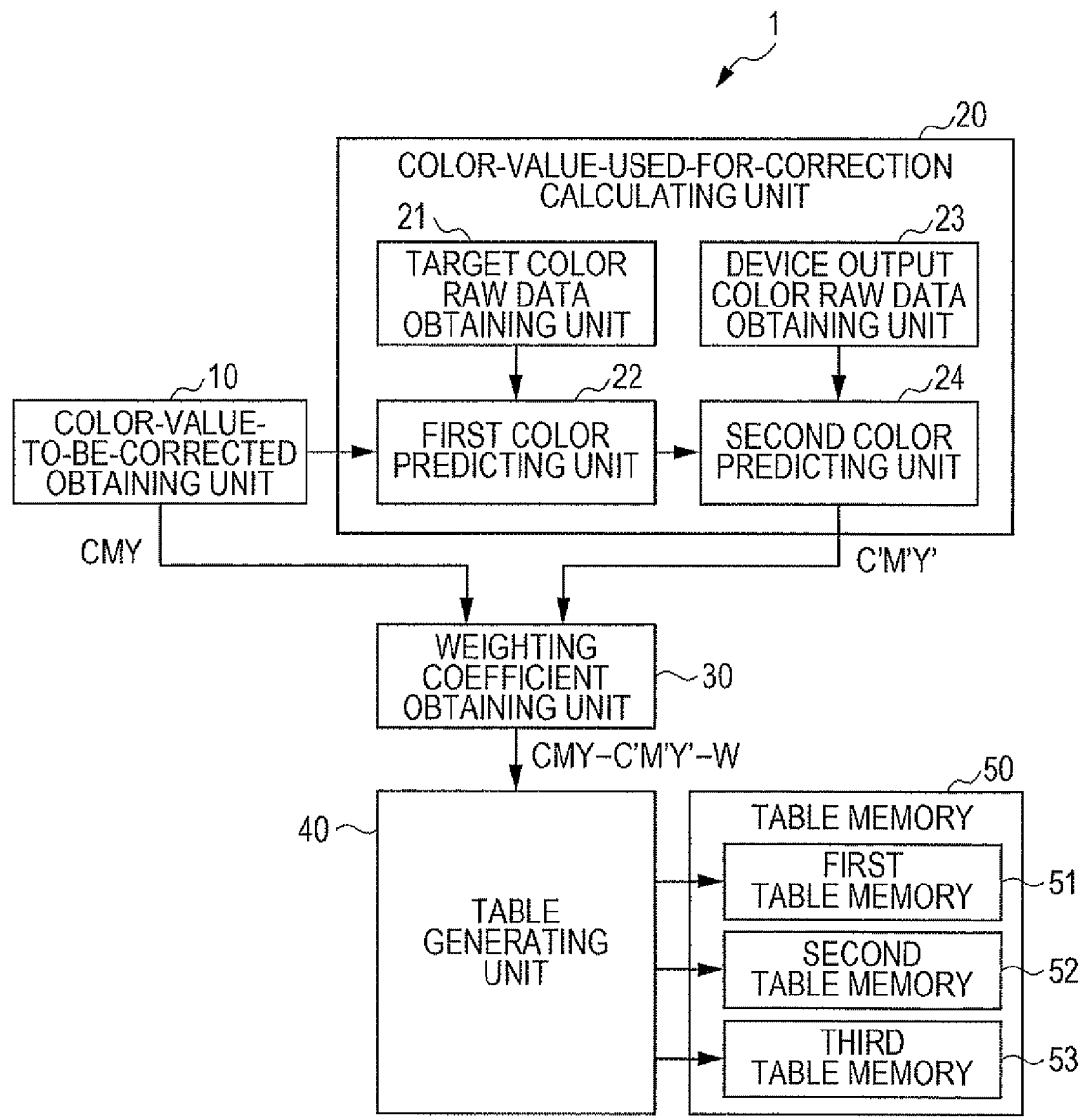
FIG. 1 is a block diagram illustrating a functional configuration of a color correction coefficient generating apparatus according to an exemplary embodiment of the present invention.

Hereinafter, an exemplary embodiment of the present invention will be described in detail with reference to the attached drawings.

Color matching, calibration, color proofing, and the like may be performed in devices, such as a printer, a display, and a scanner. Specifically, target colors in individual devices are set, correction colors in a device-dependent color space for the target colors are obtained, and color correction is performed using the correction colors. Here, in the case of calibration, one-dimensional look up tables (LUTs) (tone reproduction curves (TRCs)) are used for color correction in most cases under the present circumstances, and there are two technologies in rough classification: single color calibration for correcting a single color; and gray balance calibration for correcting process black made by mixing three colors C, M, and Y. In these types of calibration, however, a region to be corrected is limited. For example, correction is performed exclusively on a single color in single color calibration, whereas correction is performed exclusively on gray in gray balance calibration. Thus, there is no guarantee for the other colors, a situation actually occurs in which a process gray portion is colored during single color calibration, and also a situation actually occurs in which the accuracy of color difference of a single color is degraded in gray balance calibration.

In order to address such situations, one-dimensional LUTs for correcting an entire color region of a device in a well-balanced manner may be generated. Specifically, one-dimensional LUTs are generated by obtaining data of an entire region about target colors and device output colors. If correction is performed using such one-dimensional LUTs, a region to be corrected is not limited, for example, a moderate correction of gray and a single color may be performed, and a well-balanced correction may be performed in view of the accuracy of an entire color gamut.

In the foregoing correction, however, color correction coefficients of the entire color gamut are compressed to one-dimensional color correction coefficients, and thus it is difficult to directly reflect the color correction coefficients of a specific region. Particularly, it is difficult to control a reproduction start point of a highlight portion (the point where gradation starts to appear) and an end of a dark portion (the point of the highest density), which are emphasized in calibration, and thus the correction accuracy depends on raw data.

In view of these inconveniences, according to this exemplary embodiment, weighting coefficients are set to a highlight portion and a dark portion in the case of generating one-dimensional LUTs for correcting an entire color region of a device in a well-balanced manner. For example, in the case of generating one-dimensional LUTs that enable a moderate correction of gray and a single color, weighting coefficients for completely emphasizing a single color are set to a highlight portion and a dark portion. Also, smoothing is applied to weighting coefficients from a highlight portion to an intermediate density portion and from the intermediate density portion to a dark portion, thereby reducing the risk of occurrence of gradation error. Note that the highlight portion is an example of a low-density range, which is a range of density lower than a predetermined upper limit, and the dark portion is an example of a high-density range, which is a range of density higher than a predetermined lower limit.

Hereinafter, a specific exemplary embodiment for generating such one-dimensional LUTs will be described.

FIG. 1 is a block diagram illustrating an example functional configuration of a color correction coefficient generating apparatus according to the exemplary embodiment of the present invention.

A color correction coefficient generating apparatus 1 according to this exemplary embodiment includes a color-value-to-be-corrected obtaining unit 10, a color-value-used-for-correction calculating unit 20, a weighting coefficient obtaining unit 30, a table generating unit 40, and a table memory 50.

The color-value-to-be-corrected obtaining unit 10 obtains input color values to be corrected. Color correction coefficients are to be generated for the color values to be corrected that are obtained here, and thus it is desirable that these input color values include color information that is useful for correction. For example, information about CMY, such as each of single colors C, M, and Y and gray as a mixture of the three colors, may be generated. When it is necessary to perform correction on the entire color gamut, information about grid points, such as in a DLUT grid, may be generated. Here, examples of the color values to be corrected include the values shown in the column "color values to be corrected" in FIG. 2. FIG. 2 illustrates the data of tertiary colors ($11^3$ colors) including single colors with the coverage in 10% intervals. In this specification, C, M, and Y are used as device-dependent color values. Even if K is added thereto, this exemplary embodiment functions in a similar manner as that described below. In this exemplary embodiment, color values are used as pieces of color information, and the color-value-to-be-corrected obtaining unit 10 is provided as an example of a first color information obtaining unit that obtains pieces of color information to be corrected.

The color-value-used-for-correction calculating unit 20 calculates color values used for correction corresponding to the color values to be corrected that have been obtained by the color-value-to-be-corrected obtaining unit 10. Specifically, the color-value-used-for-correction calculating unit 20 includes a target color raw data obtaining unit 21, a first color predicting unit 22, a device output color raw data obtaining unit 23, and a second color predicting unit 24.

Among these units, the target color raw data obtaining unit 21 obtains target color raw data.

Here, the target color raw data is an example of first correspondence information and is raw data representing output colors of a target device in the case of performing color correction.

FIG. 3A illustrates an example of the target color raw data. This is an example of the target color raw data in the case of a CMY three-color printer. In this case, the target color raw data is a set of data pairs of device-dependent data (CMY) and device-independent data (L*a*b*) corresponding thereto. Here, typical L*a*b* is used for device-independent data, but an alternative may be accepted. For example, data in a colorimetric system that is classified into tristimulus values XYZ, a uniform color space L*u*v*, or the like, data represented by polynomial approximation, such as (Lab)=F(CMY), data represented by a physical model formula, such as Neugebauer, Kubelka-Munk, or Lambert-Beer, and data that is converted in accordance with an ICC profile or the like may be used That is, any data may be used as long as data pairs representing the characteristics of the device may be generated. Typically, the number of data pairs is not limited, but around 200 to 1600 is appropriate in view of the color accuracy and system configuration. Accordingly, the output characteristic of a target device may be recognized, so that output colors of the device with respect to the color values to be corrected may be predicted.

Also, the first color predicting unit 22 predicts device-independent data (e.g., L*a*b*) corresponding to the device-dependent data (e.g., CMY) to be corrected that has been obtained by the color-value-to-be-corrected obtaining unit 10 by using the target color raw data (CMY→fL*a*b*). Various inventions have been made regarding the color prediction method. For example, color prediction may be performed using the method described in Japanese Unexamined Patent Application Publication No. 10-262157, but another method may be used instead.

On the other hand, the device output color raw data obtaining unit 23 obtains device output color raw data.

Here, the device output color raw data is an example of second correspondence information and is raw data representing output colors in a device that outputs an image.

FIG. 3B illustrates an example of the device output color raw data. This is an example of the device output color raw data in the case of a CMY three-color printer. As seen in the figure, the form of the device output color raw data is the same as that of the target color raw data. That is, the device output color raw data is a set of data pairs of device-dependent data (CMY) and device-independent data (L*a*b*) corresponding thereto. Note that, as described above regarding the target color raw data, the type of device output color raw data is not limited thereto, and any type is acceptable as long as data pairs representing the characteristics of the device may be generated. In addition, although the number of data pairs is not limited, around 200 to 1600 is appropriate in view of the color accuracy and system configuration.

Also, the second color predicting unit 24 predicts device-dependent data (e.g., C'M'Y') corresponding to the device-independent data (e.g., L*a*b*) generated by the first color predicting unit 22 by using the device output color raw data (L*a*b*→C'M'Y'). As in the case of the first color predicting unit 22, various inventions have been made regarding the color prediction method used in the second color predicting unit 24. For example, color prediction may be performed using the method described in Japanese Unexamined Patent Application Publication No. 10-262157, but another method may be used instead.

In the manner described above, the color-value-used-for-correction calculating unit 20 calculates color values used for correction corresponding to all the color values to be corrected that have been obtained by the color-value-to-be-corrected obtaining unit 10. An example of the calculated color values is shown in the field "color values used for correction" in FIG. 2. In this example, the second row from the top shows that (C, M, Y)=(0, 0, 10) is corrected to (C', M', Y')=(0, 0, 12). In this exemplary embodiment, the color-value-used-for-correction calculating unit 20 is provided as an example of a second color information obtaining unit that obtains pieces of color information used for correction.

The weighting coefficient obtaining unit 30 obtains weighting coefficients indicating the degree of importance of color values used for correction. The details of the weighting coefficient obtaining unit 30 will be described below. In this exemplary embodiment, the weighting coefficient obtaining unit 30 is provided as an example of a weighting coefficient obtaining unit that obtains weighting coefficients.

The table generating unit 40 generates one-dimensional LUTs (TRCs) for respective color components (e.g., C, M, and Y) forming color values to be corrected. Specifically, the table generating unit 40 generates one-dimensional LUTs on the basis of the color values used for correction calculated by the color-value-used-for-correction calculating unit 20 and the weighting coefficients for the color values used for correction. In this exemplary embodiment, the table generating unit 40 is provided as an example of a generating unit that generates color correction coefficients.

The table memory 50 stores the one-dimensional LUTs generated by the table generating unit 40. Specifically, the table memory 50 includes a first table memory 51, a second table memory 52, and a third table memory 53. The first table memory 51 stores a TRC from C in a color value to be corrected to C' in a color value used for correction. The second table memory 52 stores a TRC from M in a color value to be corrected to M' in a color value used for correction. The third table memory 53 stores a TRC from I in a color value to be corrected to Y' in a color value used for correction.

Now, the color-value-to-be-corrected obtaining unit 10 will be described in detail.

In the color-value-to-be-corrected obtaining unit 10, a process regarding a reproduction start point of a highlight portion and an end of a dark portion of a one-dimensional LUT (TRC) that is focused on in this exemplary embodiment may be performed. That is, the reproduction start point is useful as a basic performance of a target device of color correction, and may have a definition "visually recognizable in 3% print", for example. Thus, it is effective that correction of a reproduction start point may be adjusted very sensitively. In the case of performing color reproduction of a dark portion, it may be necessary to adjust the end, as in the reproduction start point, regarding reproduction of color characters of 100% pure color.

Figure 4:
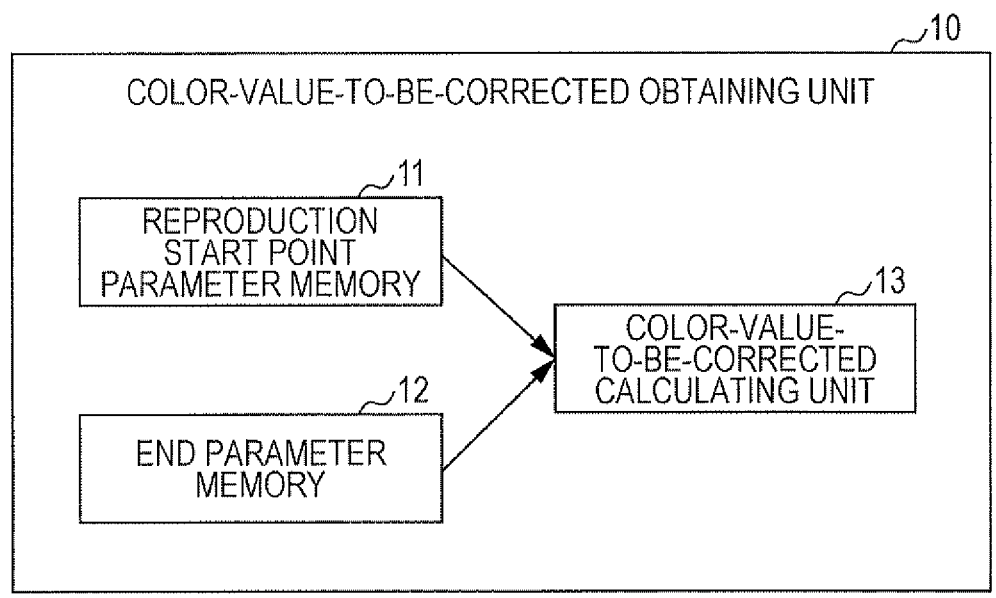
FIG. 4 is a block diagram illustrating a functional configuration of a color-value-to-be-corrected obtaining unit according to the exemplary embodiment of the present invention.

FIG. 4 is a block diagram illustrating an example functional configuration of the color-value-to-be-corrected obtaining unit 10 in this case.

As illustrated, the color-value-to-be-corrected obtaining unit 10 includes a reproduction start point parameter memory 11, an end parameter memory 12, and a color-value-to-be-corrected calculating unit 13.

The reproduction start point parameter memory 11 stores parameters regarding addition or modification of color values to be corrected in a highlight portion.

The end parameter memory 12 stores parameters regarding addition, deletion, or modification of color values to be corrected in a dark portion.

The color-value-to-be-corrected calculating unit 13 determines color values to be corrected in a highlight portion in accordance with a reproduction start point parameter, and determines color values to be corrected in a dark portion in accordance with an end parameter. If addition of a single color of 1, 2, 3, and 7% is stored as a reproduction start point parameter, for example, color values to be corrected of a single color of 1, 2, 3, and 7% are added to the data of an entire color gamut. If deletion of a secondary color or more of 90% or more is stored as an end parameter, for example, color values to be corrected of a secondary color or more of 90% or more are deleted. That is, data near the reproduction start point is increased in a highlight portion, and extra data that is not necessary for a process performed on the end is removed in a dark portion, thereby adjusting correction sensitivity.

Here, regarding the color values to be corrected, the reproduction start point of a highlight portion and the end of a dark portion are adjusted. In this case, a similar process is necessary for the target color raw data obtained by the target color raw data obtaining unit 21 and the device output color raw data obtained by the device output color raw data obtaining unit 23. This is because, even if the data about color values to be corrected is adjusted, color prediction in the color-value-used-for-correction calculating unit 20 is difficult to perform, and particularly color prediction with respect to the reproduction start point is very difficult, if the target color raw data and the device output color raw data do not correspond to the adjusted data.

Thus, data is adjusted also in a raw data patch obtaining unit 60 that obtains data serving as a base of a raw data patch (data of raw data patch), which is used for obtaining target color raw data and device output color raw data.

Figure 5:
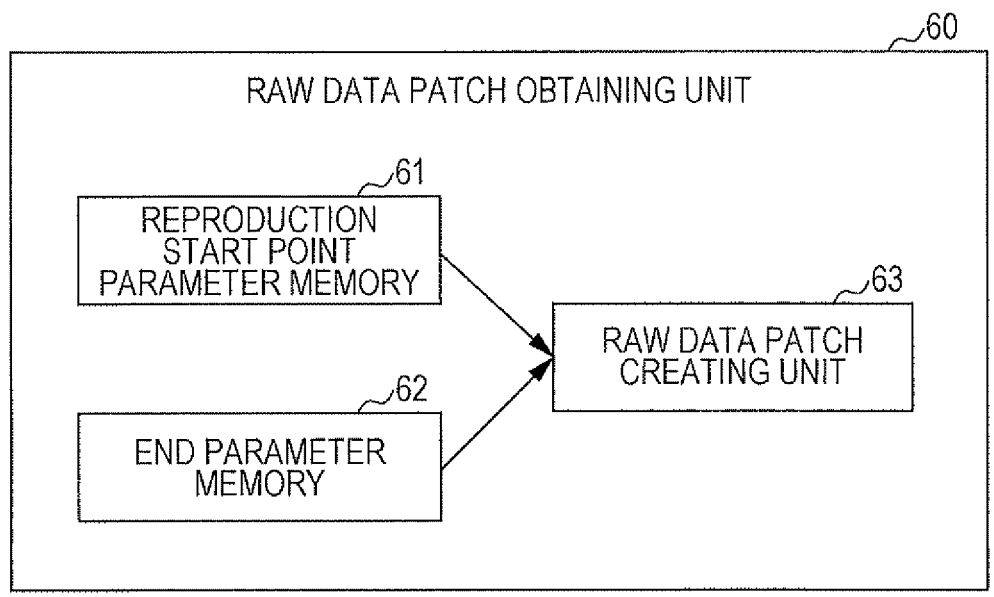
FIG. 5 is a block diagram illustrating a functional configuration of a raw data patch obtaining unit according to the exemplary embodiment of the present invention.

FIG. 5 is a block diagram illustrating an example functional configuration of the raw data patch obtaining unit 60.

As illustrated, the raw data patch obtaining unit 60 includes a reproduction start point parameter memory 61, an end parameter memory 62, and a raw data patch creating unit 63.

The reproduction start point parameter memory 61 stores parameters regarding addition or modification of data of a raw data patch in a highlight portion.

The end parameter memory 62 stores parameters regarding addition, deletion, or modification of data of a raw data patch in a dark portion.

The raw data patch creating unit 63 creates data of a raw data patch of a highlight portion in accordance with reproduction start point parameters, and creates data of a raw data patch of a dark portion in accordance with end parameters. If addition of a single color of 1, 2, 3, and 7% is stored as a reproduction start point parameter, for example, the data of a raw data patch of a single color of 1, 2, 3, and 7% is added to the data of an original raw data patch. If deletion of a secondary color or more of 90% or more is stored as an end parameter, the data of a raw data patch of a secondary color or more of 90% or more is deleted from the data of an original raw data patch.

In this exemplary embodiment, the raw data patch obtaining unit 60 is provided as an example of a color sample creating unit that creates plural color samples.

Next, the weighting coefficient obtaining unit 30 will be described in detail.

For example, assume the case of adding a single-color-emphasized weighting coefficient to a color value used for correction that has been calculated by the color-value-used-for-correction calculating unit 20. In this case, a weighting coefficient $W_{mono}$ is determined using the following Equation 1, with a distance $D_{mono}$ between a color value to be corrected and a single color axis being a variable.

$$W_{mono} = f(D_{mono}) \qquad \text{Equation 1}$$

Figure 6A:
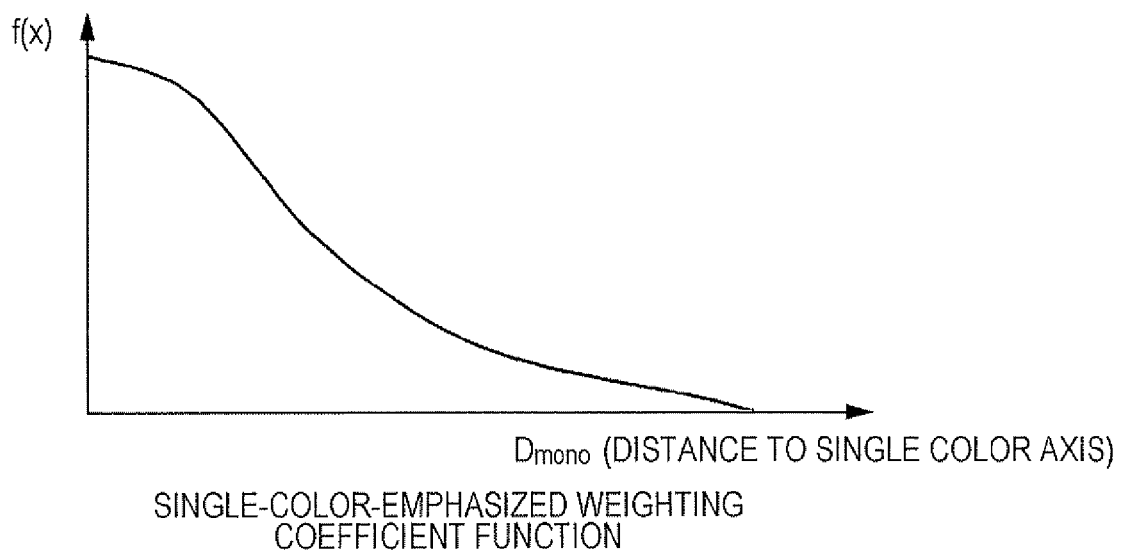
FIGS. 6A and 6B are diagrams illustrating graphs of a single-color-emphasized weighting coefficient function and a single color gradation weighting coefficient function that may be used in the exemplary embodiment of the present invention.

FIG. 6A illustrates an example of the function of Equation 1 (single-color-emphasized weighting coefficient function). As is clear from FIG. 6A, the weighting coefficient to be added is larger as the distance to the single color axis is shorter.

In addition, correction is performed on a highlight portion and a dark portion in this exemplary embodiment. That is, Equation 1 simply determines a weighting coefficient on the basis of the distance from the single color axis, but the weighting coefficient is modified for the highlight portion and the dark portion. For example, the weighting coefficient is modified using the single color gradation weighting coefficient function g(x) illustrated in FIG. 6B, as in the following Equation 2.

$$W_{mono} = f(D_{mono}) \times g(C_{in}) \qquad \text{Equation 2}$$

Figure 7A:
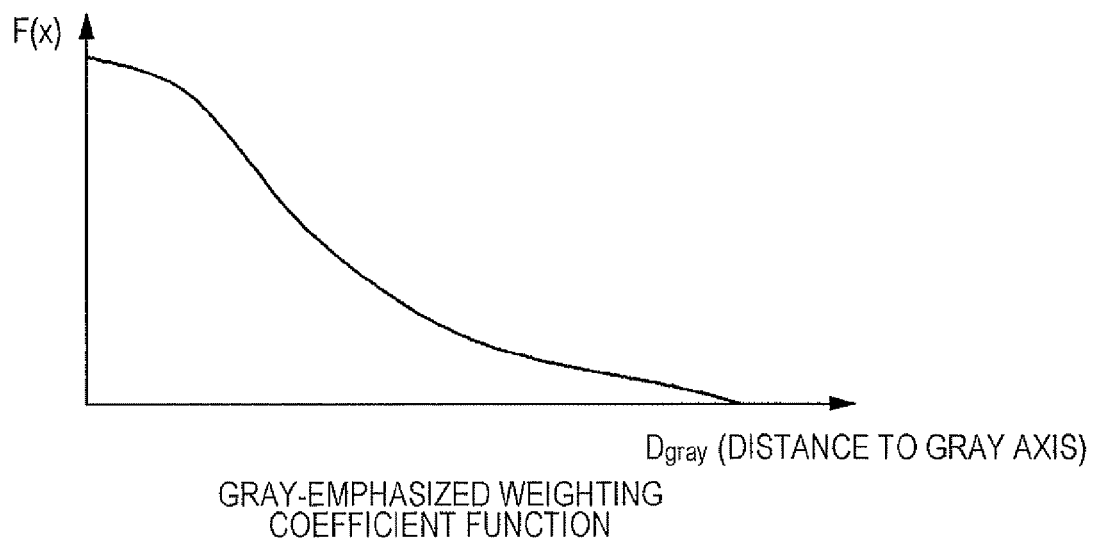
FIGS. 7A and 7B are diagrams illustrating graphs of a gray-emphasized weighting coefficient function and a gray gradation weighting coefficient function that may be used in the exemplary embodiment of the present invention.
Figure 7B:
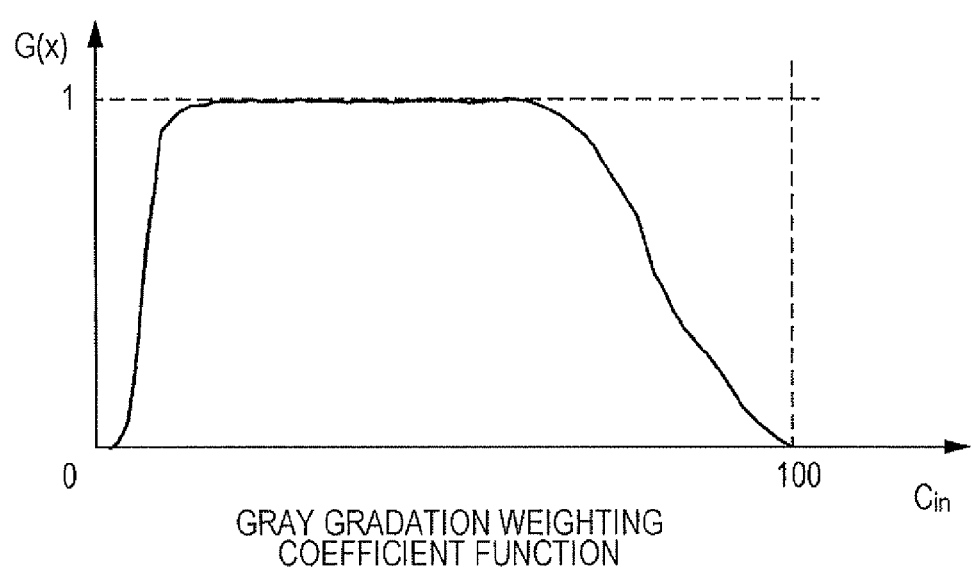

Likewise, the gray-emphasized weighting coefficient function F(x) illustrated in FIG. 7A is modified using the gray gradation weighting coefficient function G(x) illustrated in FIG. 7B, thereby realizing the highlight portion and gray portion in a gray-emphasized weight.

$$W_{gray} = F(D_{gray}) \times G(C_{in}) \qquad \text{Equation 3}$$

Furthermore, Equation 2 and Equation 3 are combined together, so that a single-color-emphasized weight is added to the highlight portion and dark portion, and a weight with a good balance of a single color and gray is added to halftone. Equation 2 and Equation 3 may be combined together in accordance with an emphasized-color parameter, which represents the degree of emphasizing a color.

Figure 8:
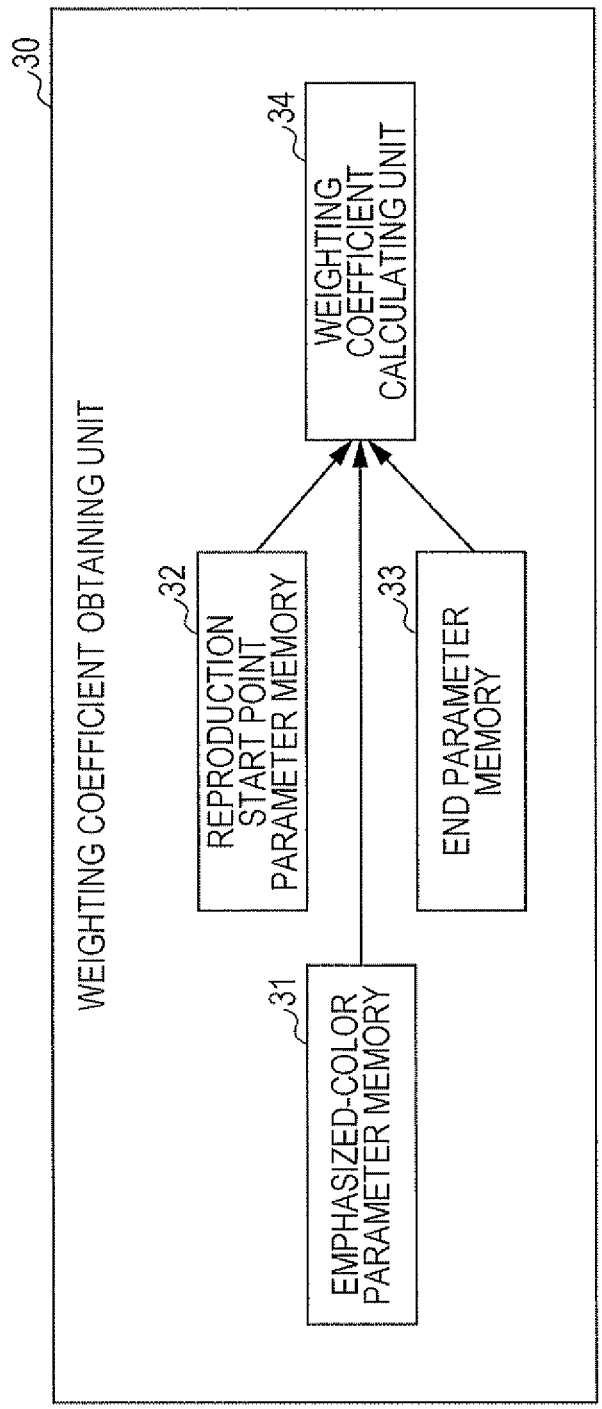
FIG. 8 is a block diagram illustrating a functional configuration of a weighting coefficient obtaining unit according to the exemplary embodiment of the present invention.

FIG. 8 is a block diagram illustrating an example functional configuration of the weight coefficient obtaining unit 30 in this case.

As illustrated in FIG. 8, the weighting coefficient obtaining unit 30 includes an emphasized-color parameter memory 31, a reproduction start point parameter memory 32, an end parameter memory 33, and a weighting coefficient calculating unit 34.

The emphasized-color parameter memory 31 stores emphasized-color parameters. Examples of the emphasized-color parameters include information about single-color-emphasized weighting coefficient functions, information about gray-emphasized weighting coefficient functions, and information about an emphasis ratio between a single color and gray.

The reproduction start point parameter memory 32 stores parameters regarding a weight for gradation in a highlight portion. For example, the reproduction start point parameter memory 32 stores parameters regarding the highlight portion of the single color gradation weighting coefficient function illustrated in FIG. 6B and the highlight portion of the gray gradation weighting coefficient function illustrated in FIG. 7B. In this exemplary embodiment, a gradation weight is used as an example of a weight based on the density of color, and a gradation weight in the highlight portion is used as an example of a weight given to each density in a low-density range.

The end parameter memory 33 stores parameters regarding a weight for gradation in the dark portion. For example, the end parameter memory 33 stores parameters regarding the dark portion of the single color gradation weighting coefficient function illustrated in FIG. 6B and the dark portion of the gray gradation weighting coefficient function illustrated in FIG. 7B. In this exemplary embodiment, a gradation weight in the dark portion is used as an example of a weight given to each density in a high-density range.

The weighting coefficient calculating unit 34 calculates weighting coefficients for color values used for correction on the basis of emphasized-color parameters, reproduction start point parameters, and end parameters. For example, assume that the emphasis ratio between a single color and gray in an emphasized-color parameter is 3:7. In this case, a weighting coefficient for a halftone portion is calculated in view of the emphasis ratio 3:7, a weighting coefficient for a highlight portion is calculated in view of the emphasis ratio 3:7 and a reproduction start point parameter, and a weighting coefficient for a dark portion is calculated in view of the emphasis ratio 3:7 and an end parameter.

Here, a single color and gray are specified as emphasized colors. Alternatively, one of these colors may be specified.

Also, a color on a single axis in a color space of a single color and gray is specified here. Alternatively, any color region in the color space may be specified. If a color region is specified, a weighting coefficient for emphasizing the color region may be obtained on the basis of not only the distance between an axis and a color represented by a color value to be corrected in a device-independent color space but also a position relationship between the specified color region and the color represented by the color value to be corrected in the device-independent color space.

Furthermore, in this exemplary embodiment, the single color gradation weighting coefficient function forms the shape illustrated in Fig. GB, and the gray gradation weighting coefficient function forms the shape illustrated in FIG. 7B, but these shapes are only an example. Alternatively, in individual gradation weighting coefficient functions, the weight in the dark portion may be substantially equivalent to the weight in halftone. In this case, regarding FIG. 6B, the weight for the highlight portion is larger than the weights for the halftone and dark portion. Also, in the individual gradation weighting coefficient functions, the weight in the highlight portion may be substantially equivalent to the weight in halftone. In this case, regarding FIG. 6B, the weight for the dark portion is larger than the weights for the highlight portion and halftone.

Next, the operation of the color correction coefficient generating apparatus 1 according to this exemplary embodiment will be described.

After the operation starts, the color-value-to-be-corrected obtaining unit 10 obtains color values to be corrected.

Figure 9:
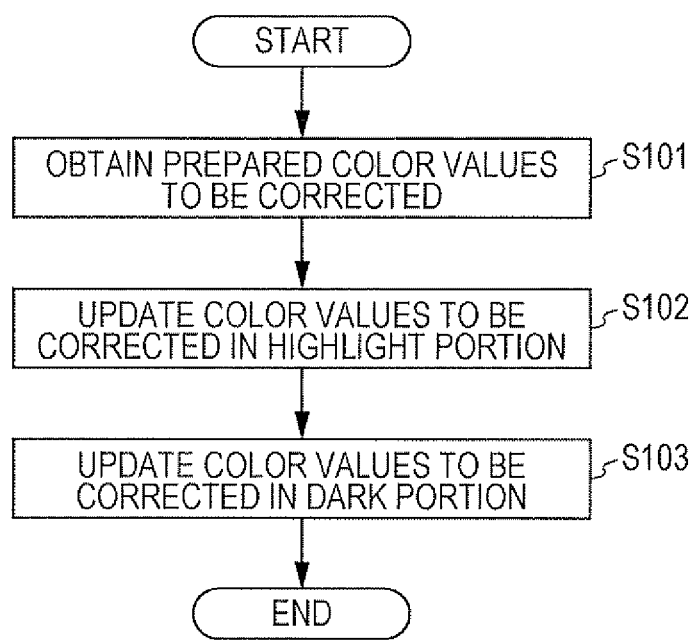
FIG. 9 is a flowchart illustrating an example operation of the color-value-to-be-corrected obtaining unit according to the exemplary embodiment of the present invention.

FIG. 9 is a flowchart illustrating an example operation of the color-value-to-be-corrected obtaining unit 10 in this case.

In the color-value-to-be-corrected obtaining unit 10, the color-value-to-be-corrected calculating unit 13 reads prepared color values to be corrected from a memory that is not illustrated (step 101).

Then, the color-value-to-be-corrected calculating unit 13 updates the highlight portion of the color values to be corrected that are read in step 101, that is, performs addition or modification of color values to be corrected, on the basis of the reproduction start point parameters stored in the reproduction start point parameter memory 11 (step 102).

Also, the color-value-to-be-corrected calculating unit 13 updates the dark portion of the color values to be corrected that are read in step 101, that is, performs addition, deletion, or modification of color values to be corrected, on the basis of the end parameters stored in the end parameter memory 12 (step 103).

Both the update in step 102 and update in step 103 are performed here. Alternatively, one of these updates may be performed.

Subsequently, the color-value-used-for-correction calculating unit 20 calculates the color values used for correction corresponding to the color values to be corrected. The data of a raw data patch for obtaining the target color raw data and device output color raw data used here is obtained by the raw data patch obtaining unit 60.

Figure 10:
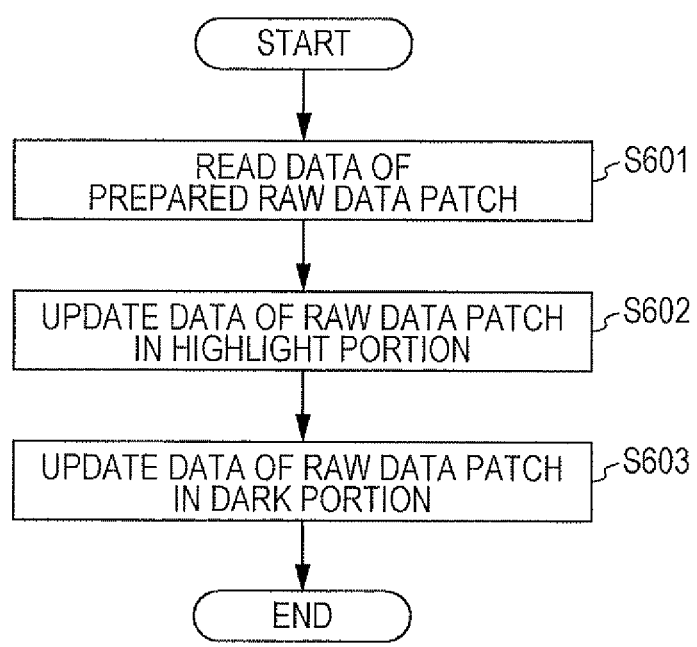
FIG. 10 is a flowchart illustrating an example operation of the raw data patch obtaining unit according to the exemplary embodiment of the present invention.

FIG. 10 is a flowchart illustrating an example operation of the raw data patch obtaining unit 60.

In the raw data patch obtaining unit 60, the raw data patch creating unit 63 reads the data of a prepared raw data patch from a memory that is not illustrated (step 601).

Then, the raw data patch creating unit 63 updates the highlight portion of the data of the raw data patch read in step 601, that is, performs addition or modification of data, on the basis of the reproduction start point parameters stored in the reproduction start point parameter memory 61 (step 602).

Also, the raw data patch creating unit 63 updates the dark portion of the data of the raw data patch read in step 601, that is, performs addition, deletion, or modification of data, on the basis of the end parameters stored in the end parameter memory 62 (step 603).

Both the update in step 602 and update in step 603 are performed here. Alternatively, one of these updates may be performed.

After that, the data of the raw data patch created in this manner is output to a printer, whereby the raw data patch is obtained, and then color values used for correction are calculated using target color raw data and device output color raw data obtained by performing color measurement on the raw data patch.

Subsequently, the weighting coefficient obtaining unit 30 determines the weighting coefficients for the color values used for correction.

Figure 11:
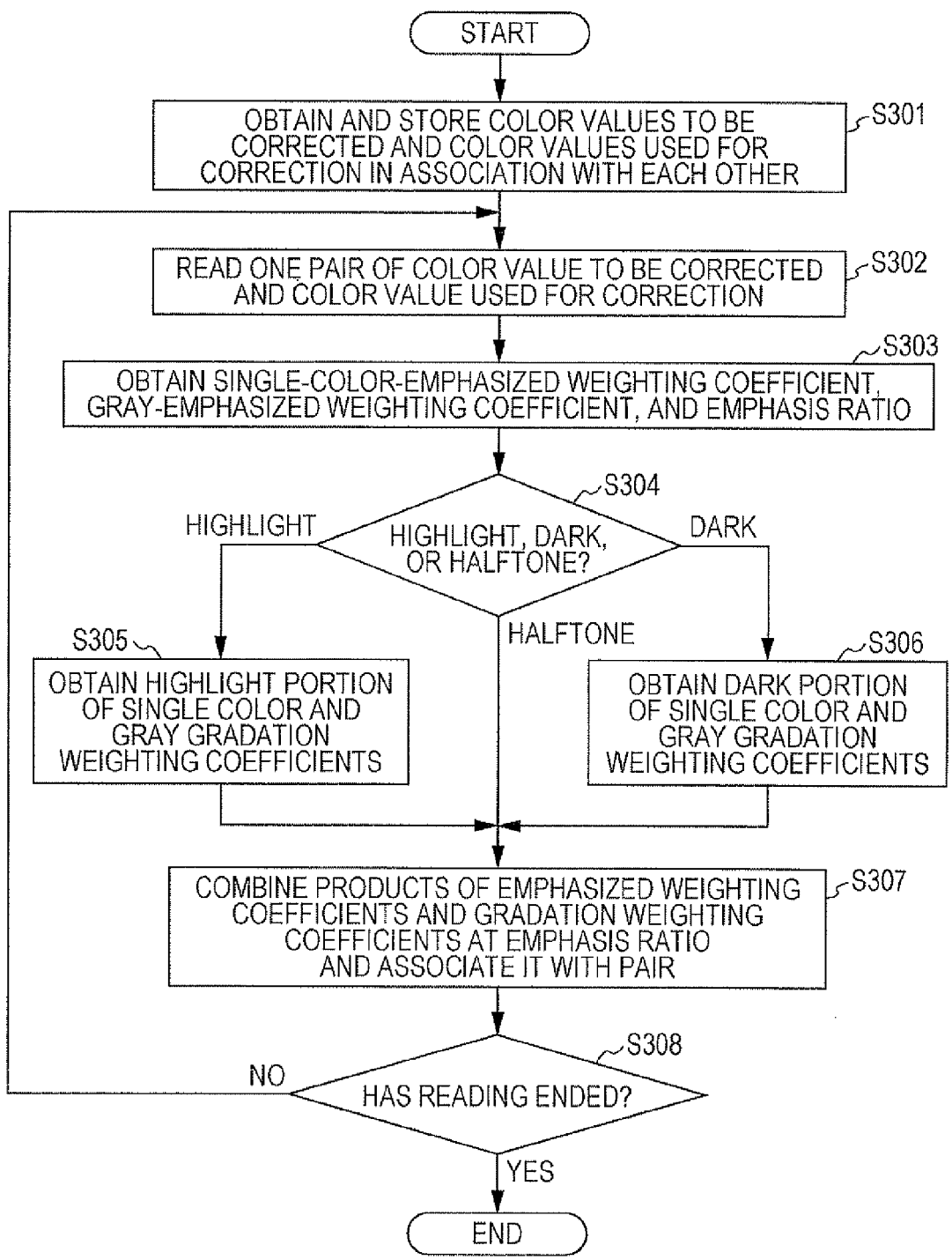
FIG. 11 is a flowchart illustrating an example operation of the weighting coefficient obtaining unit according to the exemplary embodiment of the present invention.

FIG. 11 is a flowchart illustrating an example operation of the weighting coefficient obtaining unit 30 in this case.

In the weighting coefficient obtaining unit 30, the weighting coefficient calculating unit 34 receives color values to be corrected from the color-value-to-be-corrected obtaining unit 10, and receives color values used for correction from the color-value-used-for-correction calculating unit 20, and stores the values in the memory by generating the correspondence illustrated in FIG. 12 (step 301). The form of the correspondence illustrated in FIG. 12 is the same as the form of the correspondence illustrated in FIG. 2. However, FIG. 12 illustrates the portion of a single color Y of (C, M, Y, C', M', Y')=(0, 0, 0, 0, 0, 0) to (0, 0, 100, 0, 0, 100) and the portion of gray of (C, M, Y, C', M', Y')=(1, 1, 1, 1, 1, 2) to (100, 100, 100, 100, 99, 98) for convenience of description.

Subsequently, the weighting coefficient calculating unit 34 reads one pair of a color value to be corrected and a color value used for correction corresponding thereto from the memory (step 302).

Then, the weighting coefficient calculating unit 34 extracts, from the emphasized-color parameter memory 31, the single-color-emphasized weighting coefficient, gray-emphasized weighting coefficient, and emphasis ratio for the color value to be corrected (step 303). For example, if the color value to be corrected is a color value on a single color axis, "1" is extracted as a single-color-emphasized weighting coefficient. If the color value to be corrected is a color value on a gray axis, "1" is extracted as a gray-emphasized weighting coefficient. Here, for convenience of description, the gray-emphasized weighting coefficient in a case where a color value to be corrected is a color value on a single color axis, and the single-color-emphasized weighting coefficient in a case where a color value to be corrected is a color value on a gray axis are "0".

Subsequently, the weighting coefficient calculating unit 34 judges whether the color value to be corrected is in the highlight portion, the dark portion, or the halftone portion (step 304).

As a result, if it is judged that the color value to be corrected is in the highlight portion, the weighting coefficient calculating unit 34 extracts, from the reproduction start point parameter memory 32, the single color gradation weighting coefficient and the gray gradation weighting coefficient for the color value to be corrected (step 305).

Then, the weighting coefficient calculating unit 34 combines the value that is obtained by multiplying the single-color-emphasized weighting coefficient extracted in step 303 by the single color gradation weighting coefficient extracted in step 305, and the value that is obtained by multiplying the gray-emphasized weighting coefficient extracted in step 303 by the gray gradation weighting coefficient extracted in step 305, in accordance with the emphasis ratio extracted in step 303, thereby calculating a final weighing coefficient, and stores the weighting coefficient in association with the pair of the color value to be corrected and the color value used for correction (step 307).

On the other hand, if it is judged that the color value to be corrected is in the dark portion, the weighting coefficient calculating unit 34 extracts the single color gradation weighting coefficient and the gray gradation weighting coefficient for the color value to be corrected from the end parameter memory 33 (step 306).

Then, the weighting coefficient calculating unit 34 combines the value that is obtained by multiplying the single-color-emphasized weighting coefficient extracted in step 303 by the single color gradation weighting coefficient extracted in step 306, and the value that is obtained by multiplying the gray-emphasized weighting coefficient extracted in step 303 by the gray gradation weighting coefficient extracted in step 306, in accordance with the emphasis ratio extracted in step 303, thereby calculating a final weighing coefficient, and stores the weighting coefficient in association with the pair of the color value to be corrected and the color value used for correction (step 307).

Furthermore, if it is judged that the color value to be corrected is in the halftone portion, the weighting coefficient calculating unit 34 combines the single-color-emphasized weighting coefficient and the gray-emphasized weighting coefficient extracted in step 303 in accordance with the emphasis ratio extracted in step 303, thereby calculating a final weighting coefficient, and stores the weighting coefficient in association with the pair of the color value to be corrected and the color value used for correction (step 307).

After that, the weighting coefficient calculating unit 34 judges whether all the pairs of a color value to be corrected and a color value used for correction stored in the memory have been read (step 308). As a result, if not all the pairs have been read, the process returns to step 302, and the same process is performed on the next pair. If all the pairs have been read, the process of calculating weighting coefficients ends.

FIG. 13 illustrates the result of the above-described process, that is, a state where weighting coefficients have been added to the correspondence between color values to be corrected and color values used for correction.

Figure 6B:
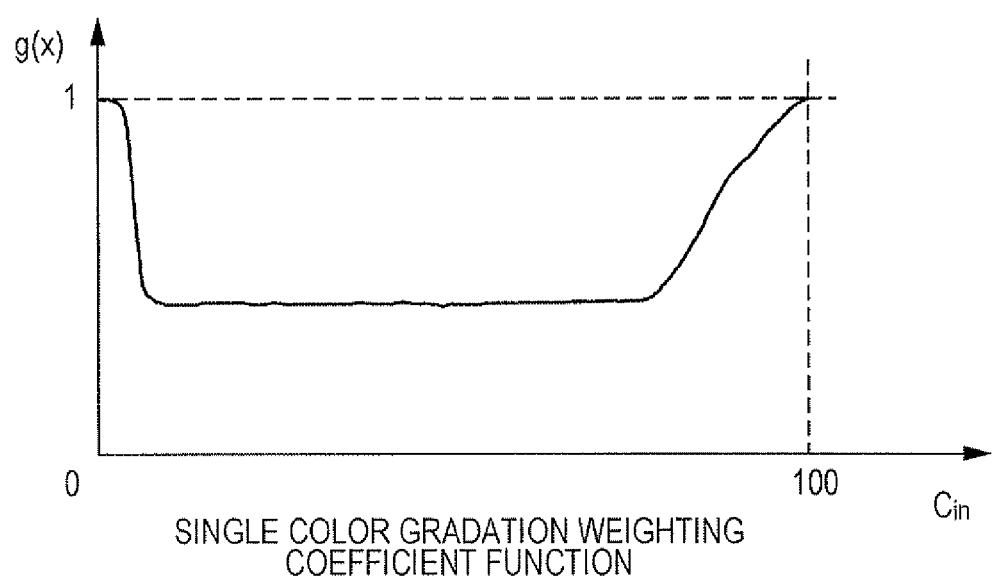

Here, a weighting coefficient "1.00" is added to (C, M, Y, C', M', Y')=(0, 0, 0, 0, 0, 0), (0, 0, 3, 0, 0, 4), (0, 0, 100, 0, 0, 100), etc. Also, a weighting coefficient "0.43" is added to (C, M, Y, C', M', Y')=(0, 0, 20, 0, 0, 25), (0, 0, 70, 0, 0, 74), etc. That is, the single-color-emphasized weighting coefficient is "1" and the gray-emphasized weighting coefficient is "0" for a single color Y, and thus the single color gradation weighting coefficient illustrated in FIG. 6B is reflected as is.

Also, a weighting coefficient "1.00" is added to (C, Y, C', M', Y')=(20, 20, 20, 23, 22, 22), (60, 60, 60, 61, 63, 59), etc. Also, a weighting coefficient "0.00" is added to (C, M, Y, C', M', Y')=(1, 1, 1, 1, 1, 2), (3, 3, 3, 3, 3, 4), (100, 100, 100, 100, 99, 98), etc. That is, the gray-emphasized weighting coefficient is "1" and the single-color-emphasized weighting coefficient is "0" for gray, and thus the gray gradation weighting coefficient illustrated in FIG. 7B is reflected as is.

Although not illustrated, weighting coefficients are also added for colors other than a single color and gray by combining the value that is obtained by multiplying a single-color-emphasized weighting coefficient by a single color gradation weighting coefficient, and the value that is obtained by multiplying a gray-emphasized weighting coefficient by a gray gradation weighting coefficient, in accordance with an emphasis ratio (e.g., 3:7).

After the weighting coefficients for the color values used for correction have been determined in the above-described manner, the table generating unit 40 generates one-dimensional LUTs.

Figure 14:
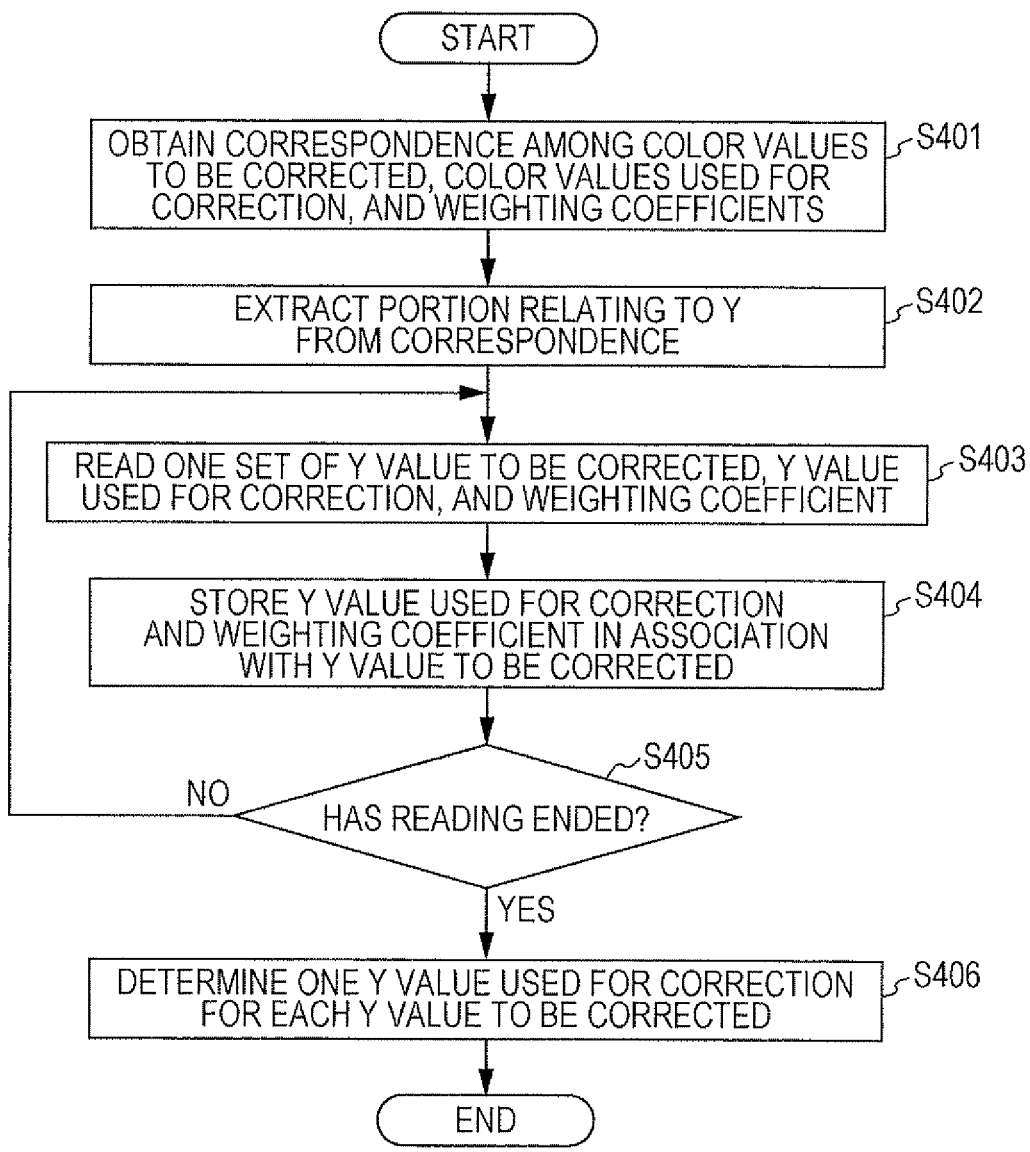
FIG. 14 is a flowchart illustrating an example operation of a table generating unit according to the exemplary embodiment of the present invention.

FIG. 14 is a flowchart illustrating an example operation of the table generating unit 40 in this case. The operation of the table generating unit 40 includes an operation for generating a TRC for converting a C signal, an operation for generating a TRC for converting an M signal, and an operation for generating a TRC for converting a Y signal. These operations are basically the same, and thus the operation for generating a TRC for converting a Y signal will be described here.

Upon start of the operation, the table generating unit 40 receives the correspondence among the color values to be corrected, the color values used for correction, and the weighting coefficients illustrated in FIG. 13 from the weighting coefficient obtaining unit 30, and stores it in the memory (step 401). Also, the table generating unit 40 extracts, from the correspondence, the portion of Y in the color values to be corrected (hereinafter referred to as "Y values to be corrected") and the portion of Y' in the color values used for correction (hereinafter referred to as "Y values used for correction) (step 402). FIG. 15 illustrates the correspondence among the extracted Y values to be corrected and Y values used for correction, and the weighting coefficients W.

Subsequently, the table generating unit 40 reads one set of a Y value to be corrected, a Y value used for correction, and a weighting coefficient from the memory (step 403). Then, the table generating unit 40 stores the Y values used for correction and the weighting coefficients for the respective Y values to be corrected (step 404). In the example illustrated in FIG. 15, (Y', W)=(0, 1.00), . . . is stored for Y=0. Also, (Y', W)=(2, 1.00), . . . , and (2, 0.00) are stored for Y=1. Also, (Y', W)=(3, 1.00), . . . and (3, 0.00) are stored for Y=2.

After that, the table generating unit 40 judges whether all the sets of a Y value to be corrected, a Y value used for correction, and a weighting coefficient stored in the memory have been read (step 405). As a result, if not all the sets have been read, the process returns to step S403, and the same process is performed on the next set of a Y value to be corrected, a Y value used for correction, and a weighting coefficient. If all the sets have been read, a process of determining one Y value used for correction with respect to each Y value to be corrected is performed (step 406).

Here, a simple example of a process of determining one Y value used for correction may be a method for calculating a weighted average for individual Y values to be corrected that are associated with Y values used for correction and weighting coefficients. That is, a method for calculating a weighted average by using a weight, which is a weighting coefficient for each of plural Y values used for correction with respect to a certain Y value to be corrected.

In this method, however, a Y value used for correction is not obtained for a Y value that is not associated with a Y value used for correction and a weighting coefficient. There is a method for obtaining the Y value used for correction using interpolation, but this method is not appropriate because another problem, such as gradation step, occurs. The accuracy may be increased by making intervals small, but this causes an increase in the amount of calculation and may cause a problem in gradation.

In view of such a problem, weighted regression-based calculation is performed in this exemplary embodiment. That is, a correction coefficient is calculated using weighted local regression on the basis of the data illustrated in FIG. 15. The method described in the above-mentioned Japanese Unexamined Patent Application Publication No. 10-262157 may be used for calculating the correction coefficient. Here, a specific calculation method will be briefly described. In this method, in order to determine one Y value used for correction for a target Y value to be corrected, not only the Y value used for correction and the weighting coefficient for the Y value to be corrected but also the Y values used for correction and the weighting coefficients for other Y values to be corrected are used. Also, in this case, maximum weighting is performed on the Y value used for correction and the weighting coefficient for the target Y value to be corrected, and weighting is performed on the Y values used for correction and the weighting coefficients for the other Y values to be corrected in a decreasing manner as the difference from the target Y value to be corrected becomes large, and a local regression method is applied.

Now, the description of this exemplary embodiment ends.

In addition, the process of generating color correction coefficients according to this exemplary embodiment may be realized in a general-purpose computer. Now, assuming that the process is realized by a computer 90, the hardware configuration thereof will be described.

Figure 16:
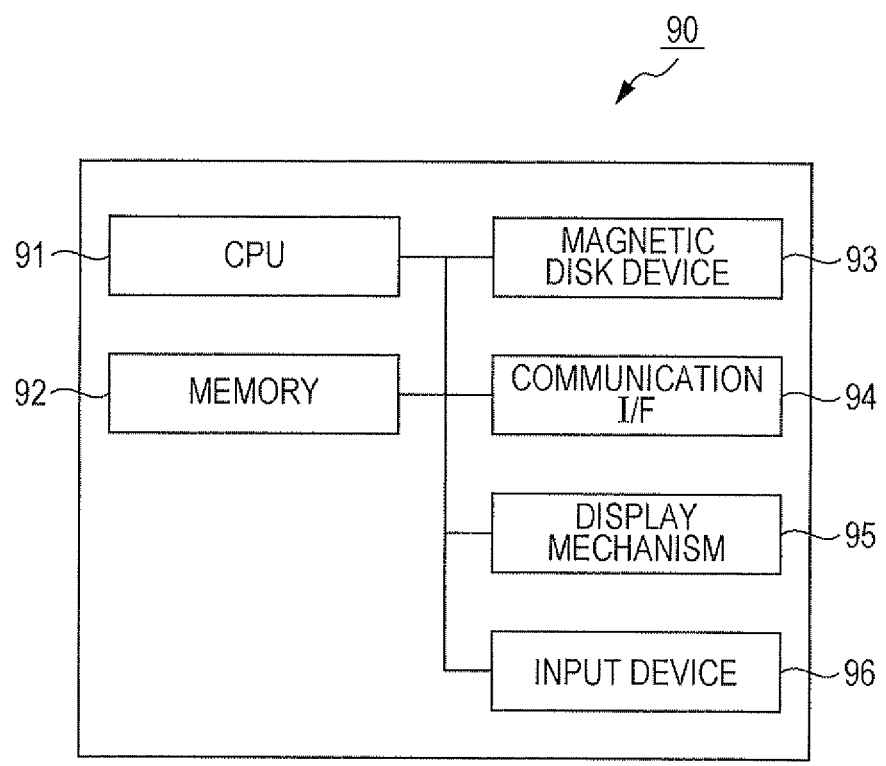
FIG. 16 is a hardware configuration diagram of a computer capable of realizing the exemplary embodiment of the present invention.

FIG. 16 is a diagram illustrating the hardware configuration of the computer 90.

As illustrated in FIG. 16, the computer 90 includes a central processing unit (CPU) 91 serving as a processing unit, and a memory 92 and a magnetic disk device (hard disk drive (HDD)) 93 serving as a storage unit. Here, the CPU 91 executes various types of software, such as an operating system (OS) and an application, thereby realizing the above-described individual functions. Also, the memory 92 is a storage area for storing various types of software and data or the like that is used for executing the software, and the magnetic disk device 93 is a storage area for storing data input to the various types of software and data output from the various types of software.

Furthermore, the computer 90 includes a communication interface (I/F) 94 for performing communication with the outside, a display mechanism 95 including a video memory, a display, and the like, and an input device 96 including a keyboard, a mouse, and the like.

The program realizing this exemplary embodiment may be provided by a communication unit, or may be provided by being stored in a recording medium, such as a compact disc read only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color correction coefficient generating apparatus comprising:
    a first color information obtaining unit that obtains pieces of color information to be corrected in a color space made up of a plurality of color components including a specific color component;
    a second color information obtaining unit that obtains pieces of color information used for correction corresponding to the pieces of color information to be corrected in the color space;
    a weighting coefficient obtaining unit that obtains weighting coefficients corresponding to the pieces of color information to be corrected, on the basis of a position relationship between colors represented by the pieces of color information to be corrected and a specified color region, and weights that are based on densities of the colors represented by the pieces of color information to be corrected; and
    a generating unit that generates color correction coefficients for correcting specific density values, by using density values of the specific color component of a plurality of the pieces of color information used for correction corresponding to a plurality of the pieces of color information to be corrected in which the specific color component has the specific density values, and a plurality of the weighting coefficients corresponding to a plurality of the pieces of color information to be corrected in which the specific color component has the specific density values.

2. The color correction coefficient generating apparatus according to claim 1,
    wherein the generating unit generates a one-dimensional color correction table in which a plurality of density values of the specific color component are associated with a plurality of color correction coefficients for correcting the plurality of density values.

3. The color correction coefficient generating apparatus according to claim 1,
    wherein the weighting coefficient obtaining unit uses weights that are given to individual densities in a low-density range, which is a range of density lower than a predetermined upper limit, as the weights that are based on densities of the colors represented by the pieces of color information to be corrected.

4. The color correction coefficient generating apparatus according to claim 3,
    wherein the specified color region includes a single color region, and
    wherein, among the weights that are given to the individual densities in the low-density range, a weight that is used in combination with the position relationship between the colors represented by the pieces of color information to be corrected and the single color region, is larger than weights that are given to individual densities in a range of density higher than the upper limit and in a range of density lower than a predetermined reference.

5. The color correction coefficient generating apparatus according to claim 1,
    wherein the weighting coefficient obtaining unit uses weights that are given to individual densities in a high-density range, which is a range of density higher than a predetermined lower limit, as the weights that are based on densities of the colors represented by the pieces of color information to be corrected.

6. The color correction coefficient generating apparatus according to claim 5,
    wherein the specified color region includes a single color region, and
    wherein, among the weights that are given to the individual densities in the high-density range, a weight that is used in combination with the position relationship between the colors represented by the pieces of color information to be corrected and the single color region, is larger than weights that are given to individual densities in a range of density higher than a predetermined reference and in a range of density lower than the lower limit.

7. The color correction coefficient generating apparatus according to claim 1,
    wherein the first color information obtaining unit obtains the pieces of color information to be corrected by updating prepared pieces of color information using at least any one of pieces of color information of individual densities in a low-density range, which is a range of density lower than a predetermined upper limit, and pieces of color information of individual densities in a high-density range, which is a range of density higher than a predetermined lower limit.

8. The color correction coefficient generating apparatus according to claim 1,
    wherein the first color information obtaining unit obtains the pieces of color information to be corrected in a first color space, which is a color space that depends on a target device of color correction using the color correction coefficients, and
    wherein the second color information obtaining unit obtains the pieces of color information used for correction corresponding to the pieces of color information to be corrected by converting the pieces of color information to be corrected using first correspondence information and second correspondence information, the first correspondence information representing correspondence between pieces of color information in the first color space and pieces of color information in a device-independent second color space as a target of reproduction in the device based on the pieces of color information, the second correspondence information representing correspondence between the pieces of color information in the first color space and the pieces of color information in the second color space reproduced in the device on the basis of the pieces of color information in the first color space.

9. The color correction coefficient generating apparatus according to claim 8, further comprising:
a color sample creating unit that creates a plurality of color samples that are used for obtaining the second correspondence information by updating a prepared color sample using at least any one of pieces of color information of individual densities in a low-density range, which is a range of density lower than a predetermined upper limit, and pieces of color information of individual densities in a high-density range, which is a range of density higher than a predetermined lower limit.

10. A color correction coefficient generation method comprising:
obtaining pieces of color information to be corrected in a color space made up of a plurality of color components including a specific color component;
obtaining pieces of color information used for correction corresponding to the pieces of color information to be corrected in the color space;
obtaining weighting coefficients corresponding to the pieces of color information to be corrected, on the basis of a position relationship between colors represented by the pieces of color information to be corrected and a specified color region, and weights that are based on densities of the colors represented by the pieces of color information to be corrected; and
generating color correction coefficients for correcting specific density values, by using density values of the specific color component of a plurality of the pieces of color information used for correction corresponding to a plurality of the pieces of color information to be corrected in which the specific color component has the specific density values, and a plurality of the weighting coefficients corresponding to a plurality of the pieces of color information to be corrected in which the specific color component has the specific density values.

11. A non-transitory computer readable medium storing a program causing a computer to execute a process, the process comprising:
obtaining pieces of color information to be corrected in a color space made up of a plurality of color components including a specific color component;
obtaining pieces of color information used for correction corresponding to the pieces of color information to be corrected in the color space;
obtaining weighting coefficients corresponding to the pieces of color information to be corrected, on the basis of a position relationship between colors represented by the pieces of color information to be corrected and a specified color region, and weights that are based on densities of the colors represented by the pieces of color information to be corrected; and
generating color correction coefficients for correcting specific density values, by using density values of the specific color component of a plurality of the pieces of color information used for correction corresponding to a plurality of the pieces of color information to be corrected in which the specific color component has the specific density values, and a plurality of the weighting coefficients corresponding to a plurality of the pieces of color information to be corrected in which the specific color component has the specific density values.

* * * * *